(12) United States Patent
Santiago, Jr. et al.

(10) Patent No.: US 9,741,079 B2
(45) Date of Patent: Aug. 22, 2017

(54) METHOD AND APPARATUS FOR REPLICATING AND ANALYZING DATABASES

(71) Applicant: Bank of America Corporation, Charlotte, NC (US)

(72) Inventors: Milton Santiago, Jr., Chicago, IL (US); John E. Scully, Chicago, IL (US); Daniel C. Finholt, Chicago, IL (US); James J. Potsch, Arlington Heights, IL (US); Joe Llaca, Bloomington, IN (US); Michael Horstman, West Orange, NJ (US)

(73) Assignee: Bank of America Corporation, Charlotte, NC (US)

( * ) Notice: Subject to any disclaimer, the term of this patent is extended or adjusted under 35 U.S.C. 154(b) by 201 days.

(21) Appl. No.: 14/685,317

(22) Filed: Apr. 13, 2015

(65) Prior Publication Data
US 2016/0300311 A1    Oct. 13, 2016

(51) Int. Cl.
*G07F 19/00* (2006.01)
*G06Q 40/00* (2012.01)
(52) U.S. Cl.
CPC .................. *G06Q 40/128* (2013.12)
(58) Field of Classification Search
CPC .................................................. G06Q 40/128
USPC ....................................... 705/17, 33, 37, 39
See application file for complete search history.

(56) References Cited

U.S. PATENT DOCUMENTS

| | | | |
|---|---|---|---|
| 6,873,997 | B1 | 3/2005 | Majjasie et al. |
| 7,177,828 | B1 * | 2/2007 | Land ..................... G06Q 20/102 |
| | | | 705/30 |
| 7,356,505 | B2 * | 4/2008 | March ..................... G06Q 20/00 |
| | | | 705/39 |
| 7,370,040 | B1 | 5/2008 | Kruy et al. |
| 7,451,136 | B2 | 11/2008 | Chua et al. |
| 7,668,798 | B2 | 2/2010 | Scanlon et al. |
| 7,904,440 | B2 | 3/2011 | Anderson et al. |
| 7,958,131 | B2 | 6/2011 | Bodin et al. |
| 8,407,140 | B2 * | 3/2013 | Ayala ..................... G06Q 40/00 |
| | | | 235/385 |
| 2009/0144163 | A1 | 6/2009 | Dickelman |

(Continued)

*Primary Examiner* — Rokib Masud
(74) *Attorney, Agent, or Firm* — Weiss & Arons LLP; Michael A. Springs, Esq.

(57) ABSTRACT

Methods and apparatus for analyzing and replicating databases are provided. Methods may include receiving an accounts receivable information query from a system user. The accounts receivable information query may include a payment. The payment may include a credit card payment, an EFT, a paper check and any other suitable payment. Methods may include reviewing a central database for information pertaining to the accounts receivable query. The central database may include replicated credit card databases, replicated EFT databases, replicated paper check databases and any other suitable databases. Methods may include locating, in the central database, an invoice which may exceed a threshold level of correlation to the account receivable information query. Methods may include displaying to a system user the accounts receivable information query and the corresponding invoice. Methods may include presenting to the system user a user-selectable option to reconcile the invoice with the account receivable information query.

14 Claims, 11 Drawing Sheets

(56) References Cited

U.S. PATENT DOCUMENTS

| | | |
|---|---|---|
| 2011/0071892 A1 | 3/2011 | Dickelman |
| 2014/0006244 A1* | 1/2014 | Crowley ................ G06Q 40/04 <br> 705/37 |
| 2014/0122734 A1* | 5/2014 | Higgins .............. H04L 67/2814 <br> 709/231 |
| 2014/0279420 A1 | 9/2014 | Okerlund et al. |

* cited by examiner

FIG. 10

METHOD AND APPARATUS FOR REPLICATING AND ANALYZING DATABASES

FIELD OF TECHNOLOGY

This invention relates to databases. Specifically, the invention relates to analyzing, replicating, searching and locating data within databases.

BACKGROUND OF THE DISCLOSURE

Many entities receive a high volume of communications relating to payments and payments themselves. The communication and/or payments may be received in various forms, including but not limited to paper checks, credit card payments, electronic funds transfers ("EFT") and automated clearing house payments. The payments may also be received at different locations.

Conventionally, in order to reconcile the payments with the corresponding invoices, employees were hired to review the payments and reconcile the payments with outstanding invoices. Reconciliation of the payments with the invoices may be time consuming because many times the payments do not include precise corresponding information to any specific invoice.

Therefore, the need exists for a search utility. The search utility may retrieve accounts receivable information. The search utility may enable a system user to search for invoice information, payment information or any other suitable information. A system user may be a business entity, corporation, establishment, organization, non-profit organization, firm, institution, or any other suitable entity which may require assistance with its accounts receivables. The system user may be also be an employee, volunteer, business owner, or any other suitable person who may manage accounts receivables of an entity. The search utility may display invoice information which may correspond to a payment, even if the payment does not have precise correspondence with the invoice. This may enable a system user to easily and efficiently reconcile the system user's accounts receivables.

The search utility may aggregate all of the payment information from disparate databases into one inclusive database. This may enable the search utility to retrieve the information in a quick and efficient manner.

SUMMARY OF THE INVENTION

An apparatus for replicating and analyzing databases is provided. The apparatus may include one or more receivers. The receivers may be configured to receive a paper check. The receivers may also be configured to convert the paper check into an electronic record, using a conversion processor. The paper check may have been delivered to a system user. The location of delivery may have been a lockbox associated with the system user. The location of delivery may have been a physical entity location associated with the system user.

The receivers may also be configured to receive an electronic funds transfer. The electronic funds transfer may have been delivered to an electronic location designated for the system user within a financial entity's electronic database.

The receivers may also be configured to receive a credit card payment. The credit card payment may have been delivered to the electronic location designated for the system user within the financial entity's electronic database.

The receivers may also be configured to receive a credit card payment. The credit card payment may be delivered to the electronic location designated for the system user within the financial entity's electronic database.

The apparatus may include a storage processor. The storage processor may be configured to store the electronic record of the paper check in a paper check storage database. The storage processor may be configured to store the electronic funds transfer in an electronic funds transfer storage database.

The storage processor may also be configured to store the credit card payment in a credit card payment storage database.

The storage processor may also be configured to replicate the paper check storage database. The storage processor may also be configured to replicate the electronic funds transfer storage database. The storage processor may also be configured to replicate the credit card payment storage database.

The storage processor may also be configured to store the replicated paper check storage database in a central database. The storage processor may also be configured to store the replicated paper check storage database in the central database. The storage processor may also be configured to store the replicated credit card payment storage database in the central database.

The storage processor may also be configured to normalize the data in the central database.

The apparatus may also include a search utility. The search utility may comprise a search box. The search box may accept system user input. The system user input may be a natural language query, a human language query or any other suitable system user input. The search utility may be configured to enable a system user to search for data included in the central database. Searching for data in the central database may include utilizing SQL (structured query language) queries to retrieve information from the central database. Searching for data in the central database may also include utilizing APIs (application program interfaces) to call data out of the central database. The system user may be an authenticated user.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 10 shows an illustrative diagram according to certain embodiments; and

DETAILED DESCRIPTION OF THE DISCLOSURE

Figure 1:
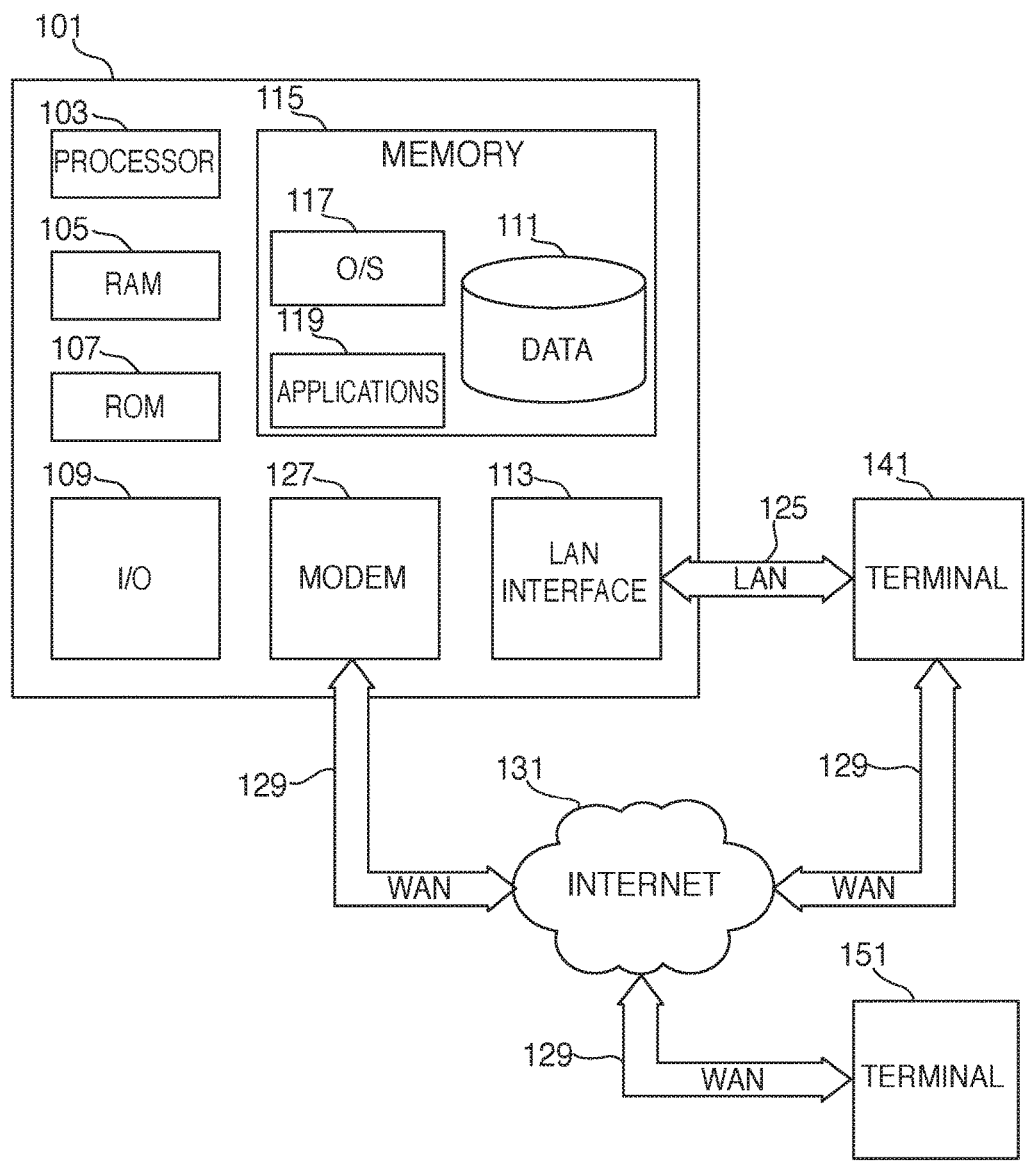
FIG. 1 shows an illustrative apparatus in accordance with principles of the invention.

Methods for replicating and analyzing multiple databases are provided. The methods may include receiving a paper check at a system user's lockbox. The lockbox may be a mailbox or a post office box associated with the system user. The lockbox may be accessible to a financial institution. The system user may instruct its clients to remit payment for services or goods rendered by the system user directly to the lockbox. The financial institution may collect the remitted payments from the lockbox. The financial institution may process the payments and deposit the funds directly into the system user's financial account. The financial institution may collect a fee from the system user for providing a lockbox service.

The methods may include receiving a paper check at a physical entity location of the system user. The physical entity location may include an office, a mailbox, a post office box, a store, a warehouse, a facility, a building, an agency, or any other suitable physical entity location.

The methods may also include receiving an electronic funds transfer at an electronic location designated for the system user within a financial entity's electronic database.

The methods may also include receiving a credit card payment at the electronic location designated for the system user within the financial entity's electronic database.

The methods may also include creating an electronic record of the paper check received at the system user's lockbox.

The methods may also include storing the electronic record of the paper check in a lockbox paper check storage database.

The methods may also include creating an electronic record of the paper check received at the physical entity location of the system user.

The methods may also include storing the electronic record received at the physical entity location in a physical entity location storage database.

The methods may also include storing the electronic funds transfer in an electronic funds transfer storage database.

The methods may include storing the credit card payment in a credit card payment storage database.

The methods may include replicating the lockbox paper check storage database. The methods may include storing the replicated lockbox paper check storage database in a central database.

The methods may include replicating the physical entity location storage database. The methods may include storing the replicated physical entity location storage database in a central database.

The methods may include replicating the electronic funds transfer storage database. The methods may include storing the replicated electronic funds transfer storage database in the central database.

The methods may include replicating the credit card payment storage database. The methods may include storing the replicated credit card payment storage database in the central database.

The methods may include normalizing the data in the central database. One exemplary form of normalizing may include normalizing the data in the central database into first normal form. First normal form may ensure that each row and column in each table of the database contains one and only one value—e.g. a transaction entry can include only one transaction amount, one sender ID, one beneficiary ID and one transaction type.

First normal form may also ensure that there is a defined key attribute for each row—e.g. a transaction entry is defined by its primary key. Such a key may be embodied as transaction ID. First normal form may ensure that one and only one transaction is defined by each transaction ID.

First normal form may also ensure that all of the attributes in each row are dependent on the primary key—e.g. the transaction amount, the sender ID, the beneficiary ID and the transaction type are all dependent on the transaction ID.

Normalizing the data may also include normalizing the data into second normal form. Second normal form may ensure that the data has no partial dependencies i.e., that no attribute included in a table is dependent on only a portion of the primary key of the table. For example, a table may include a transaction ID field. The table may also include a transaction name field. The primary key of the table may be a combination of the transaction ID field and the transaction name field. The table may also include a transaction type field. The transaction type field may be dependent on the transaction ID, and not dependent on the transaction name. Because the transaction type attribute may not be dependent on the entire primary key, the table may not be in second normal form.

Normalizing the data may also include normalizing the data into third normal form. Third normal form may ensure that the data has no transitive dependencies. A transitive dependency may be, for example, that one non-prime attribute or field is dependent on another non-prime attribute or field.

Normalizing may ensure that a transaction table includes a sender. Normalizing may also ensure that a transaction table includes a beneficiary. Normalizing may also ensure that the type of transaction, for example, paper check, EFT, credit card or any other suitable transaction type is defined in the transaction table. Normalizing may also ensure that the identification numbers associated with the transaction table are defined—e.g. an amount, a paper check number, a paper check routing number, a paper check account number, an EFT confirmation number, a credit card number, a credit card authorization code and a credit card security code.

Because normalization may make certain that the necessary fields are included in the database, a user of the database may be assured that information pertaining to each transaction can be located.

Normalizing the data may also include normalizing the data using other suitable forms of normalization.

The methods may include searching for data in the central database. The searching may utilize a search utility. The search utility may comprise a search box.

The search utility may be further configured to display a probable listing result set when a system user enters a first portion of information into the search box.

The probable listing result set may be dynamically generated. The dynamic generation may be based in part on information associated with an electronic lockbox system of the system user. The dynamic generation may be based in part on information associated with an enterprise resource planning system of the system user. The dynamic generation may also be based in part on information associated with an authenticated space associated with the system user.

The search utility may also comprise a search type field. The search type field may accept system user input related to search types. The search type field may limit the scope of the first portion of information which was entered into the search box—e.g. a number sequence "1234" may have been entered into a search box. A user may have selected "account number" as the search type. Therefore, the search utility may only present, to the system user, account numbers which include, or are similar to, the number sequence "1234". The number sequence "1234" may only be a portion of the information which the system user desires—i.e., the number sequence "1234" may be part of a larger number sequence "0000123456789", which may be the system user's checking account number.

The search types may include account number, remitter name, check number, credit card number, category, authorization code, bank ID, batch number, discount number, invoice amount, transaction ID, transaction note, zip code, invoice number, remittance name, invoice date, discount amount and any other suitable search type.

The search utility may also include an amount entry field. The search utility may also include a date entry field. The search utility may also include an account entry field. The search utility may also include a lockbox entry field. The search utility may also include a search button. The search utility may be configured to begin searching when the search button is clicked. The search utility may also be configured to begin searching when an "Enter" button located on a keyboard is depressed.

The search utility may also be configured to search in all search type categories when the system user enters information only into the search box.

The search utility may also be configured to display, to the system user, the results of the search. The results of the search may include a credit card payment, an invoice, an electronic funds transfer, an electronic record of a paper check, a check number, an account number, a transaction ID, a transaction note, a zip code, a remitter name, a remittance name, a check number, a credit card number, a category, an authorization code, a bank ID, a batch number, a discount number, a discount amount, an invoice amount, an invoice number, an invoice date, or any other suitable information.

An apparatus for enabling a search utility is also provided. The apparatus may include a display. The display may be configured to display a search box. The search box may accept system user input. The system user input may be related to an accounts receivable information query.

The display may also be configured to display a search type entry field. The search type entry field may accept user input relating to search type information. The search type information may limit the scope of the accounts receivable query to data objects correlating to the inputted search type.

The display may also be configured to display an amount entry field. The amount entry field may accept system user input. The system user input may be related to amount information. The amount information may limit the scope of the accounts receivable information query to data objects including the inputted amount.

The display may also be configured to display a date entry field. The date entry field may accept system user input relating to date information. The date entry field may also accept system user input relating to a range of dates. The date entry field may accept system user input relating to a specific date. The date information may limit the scope of the accounts receivable information query to data objects comprising the inputted date.

The display may also be configured to display an account entry field. The account entry field may accept system user input. The system user input may be related to account information. The account information may limit the scope of the accounts receivable information query to data objects comprising the inputted account information.

The display may also be configured to display a lockbox entry field. The lockbox entry field may accept system user input relating to lockbox information. The lockbox information may limit the scope of the accounts receivable information query to data objects comprising the lockbox information.

When an authenticated system user enters a first portion of information into the search box, the apparatus may also be configured to search a central database for data corresponding to the first portion of information. The central database may include normalized data. The normalized data may relate to accounts receivable information of the system user.

In some embodiments, the normalized data may relate to accounts receivable information of many entities. In these embodiments, the apparatus may be configured to search for data relating to the system user.

The normalized data may be aggregated into a central database from a plurality of databases. The plurality of databases may be associated with the system user's accounts receivable information.

The plurality of databases may include a paper check storage database. The plurality of databases may also include an electronic funds transfer storage database. The plurality of databases may also include a credit card payment storage database.

The paper check storage database may include electronic records of a plurality of paper checks. The system user may be the beneficiary of the paper checks. The paper checks may have been received at the system user's lockbox. The paper checks may also have been received at the system user's physical entity location.

The electronic funds transfer storage database may include a plurality of electronic funds transfers. The system user may be the beneficiary of the electronic funds transfers. The electronic funds transfers may have been received at an electronic location designated for the system user within a financial entity's electronic database.

The credit card payment storage database may include a plurality of credit card payments received at the electronic location designated for the system user within the financial entity's electronic database. The system user may be the beneficiary of the credit card payments.

When the system user enters lockbox information into the lockbox entry field, the search utility may be configured to search for data only in the section of the central database which corresponds to the system user-entered lockbox information.

The processor may also be configured to locate data associated with the accounts receivable information query. The located data may comprise a payment. The payment may correspond to an electronic record of a paper check. The payment may also correspond to an electronic funds transfer. The payment may also correspond to a credit card payment. The located data may also include an invoice corresponding to the payment. The search utility may also be configured to display to the system user a user-selectable option. The user-selectable option may be to reconcile the invoice with the payment. The processor may be configured to mark an electronic record of the invoice as paid when the system user selects the user-selectable option to reconcile the invoice with the payment.

When the system user enters the first portion of information into the search box and the first portion of information is associated with a paper check received by the system user, the search utility may be configured to attempt to locate an invoice which includes information which corresponds to the paper check. If the search utility is unable to locate an invoice which includes information which corresponds to the paper check, the search utility may be configured to search for an invoice. The invoice may include invoice information which surpasses a predetermined threshold of correspondence to the paper check—e.g. if a system user received a paper check for 95.00 USD from fictional corporation ABC, Inc., and the search utility retrieved an invoice for 100.00 sent to ABC, Inc., the search utility may present the system user the retrieved invoice, because the 100.00 USD invoice may surpass a predetermined threshold of correspondence to the 95.00 USD paper check.

When the system user enters a first portion of information into the search box and the first portion of information is associated with an electronic funds transfer received by the system user, the search utility may be configured to attempt to locate an invoice which includes information which corresponds to the electronic funds transfer. If the search utility is unable to locate an invoice which includes information which corresponds to the electronic funds transfer, the search utility may be configured to search for an invoice. The invoice may include invoice information. The invoice information may surpass a predetermined threshold of correspondence to the electronic funds transfer.

When the system user enters a first portion of information into the search box and the first portion of information is associated with a credit card payment received by the system user, the search utility may be configured to attempt to locate, using the processor, an invoice which includes information which corresponds to the credit card payment. If the search utility is unable to locate an invoice which includes information which corresponds to the credit card payment, the search utility may be configured to search, using the processor, for an invoice comprising invoice information. The invoice information may surpass a predetermined threshold of correspondence to the credit card payment.

The search utility may be configured to correspond to a system user's ERP (enterprise resource planning) system. A system user may have specific fields that its ERP system may require. The search utility may be dynamic with respect to each system user. The search utility may present, to a system user, only the fields which correspond to the system user's ERP. For example, an authenticated system user may enter an EFT confirmation number into the search box. The search utility may have access to the system user's ERP system. The search utility may present to the system user an invoice which corresponds to the inputted EFT confirmation number. The search utility may also present to the system user a ticket number associated with the EFT. The ticket number may be associated with a system user's ERP internal tracking system. The ticket number may be presented to this specific system user because it may correspond to the specific system user's ERP system, although it may not be presented to another system user of the search utility.

In addition, the central database and normalization thereon, may also be customized for a system user's ERP system. The central database may be re-configured for each system user. The central database may maintain fields which correspond to each system user's ERP system. The central database may also utilize field names which correspond to the system user's ERP system. Correlation of the central database with the ERP system may enable a system user to utilize the search utility with familiar terminology. Correlation of the central database with the ERP system may also enable dynamic updating of the central database in the event that fields in the ERP system are updated. The updating may include, but is not limited to, revising field names, addition of fields, deletion of fields, and any other suitable updating.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, smartphone or any other suitable device for storing, transmitting and/or transporting relevant information. Terminals 151 and/or terminal 141 may be other devices. These devices may be identical to system 100 or different. The differences may be related to hardware components and/or software components.

Figure 2:
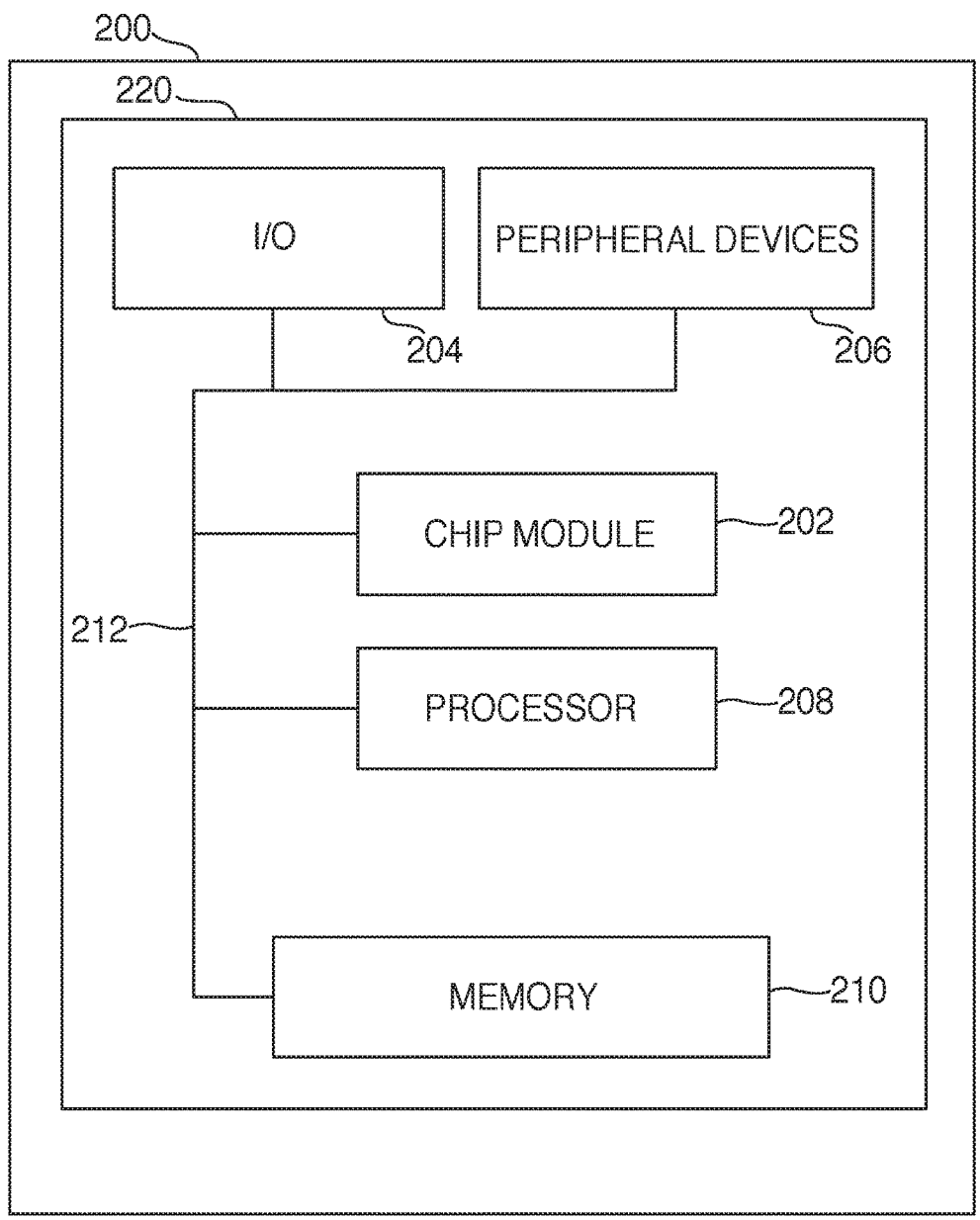
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, predict probable result listings and machine-readable memory 210.

Machine-readable memory 210 may be configured to store in machine-readable data structures: information pertaining to a user, information pertaining to queries, the current time, information pertaining to accounts receivable query parameters, information pertaining to inputters of accounts receivable queries, information pertaining to accounts receivable query lists, information pertaining to lockboxes, information pertaining to enterprise resource planning software and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
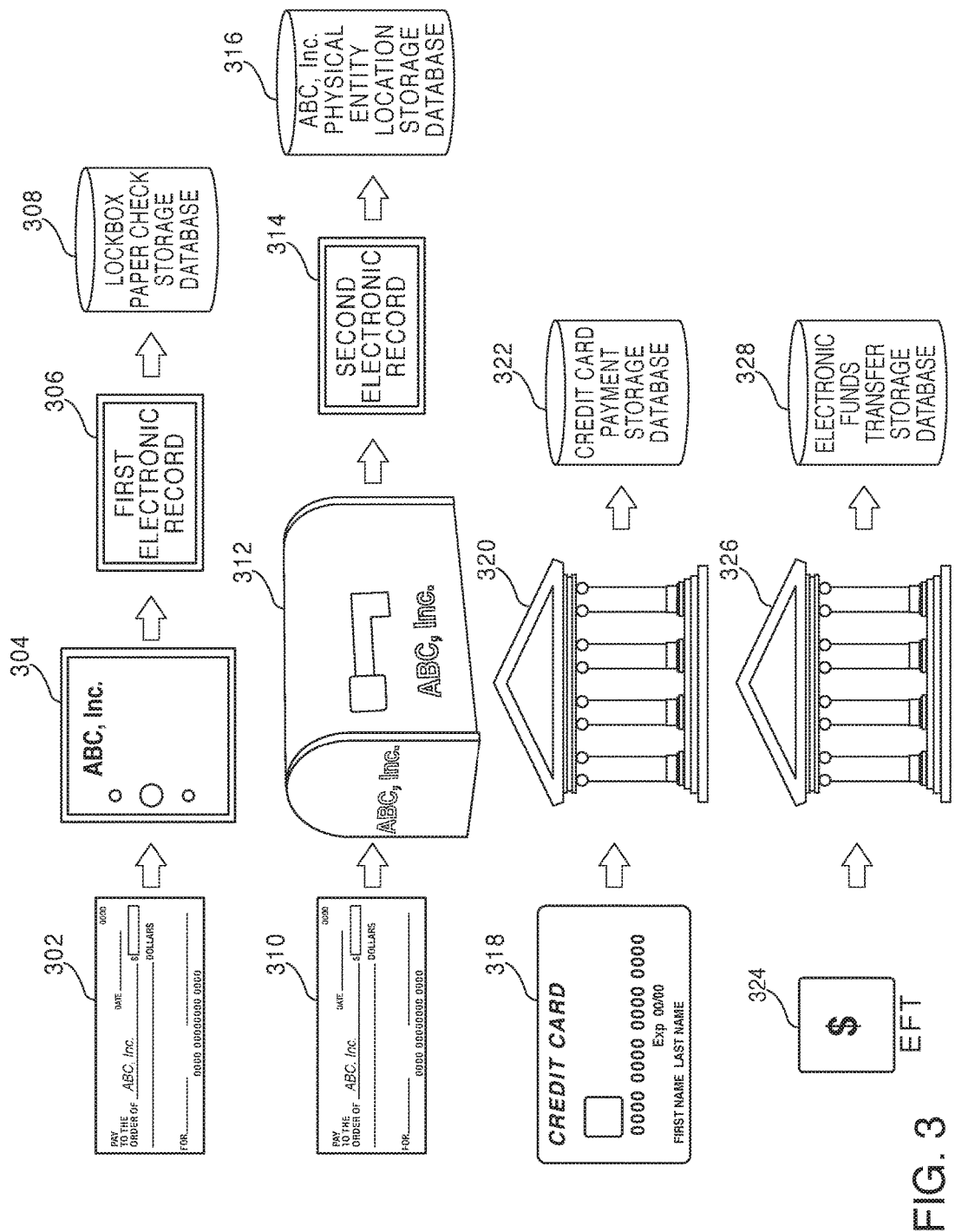
FIG. 3 shows an illustrative diagram according to certain embodiments.

FIG. 3 shows an illustrative diagram of different forms of payments transferred into different databases. The beneficiary of check 302 may be fictional corporation, ABC, Inc. (hereinafter, "ABC"). Check 302 may be delivered to lockbox 304. Lockbox 304 may be a location at which ABC receives payments. A financial institution, or any other suitable institution may collect the payments from lockbox 304. Check 302 may be converted into first electronic record 306. A scanner, camera, optical character recognition ("OCR") detection software, and any other suitable forms of software, hardware or combination thereof, may enable the conversion of check 302 to first electronic record 306. First electronic record 306 may be stored in lockbox paper check storage database 308.

The beneficiary of paper check 310 may be ABC. Paper check 310 may have been delivered to mailbox 312. Mailbox 312 may symbolize that paper check 310 was delivered to a physical entity location of ABC. A scanner, camera, OCR detection software and any other suitable forms of hardware or software may enable a conversion of paper check 310 to second electronic record 314. Second electronic record 314 may be stored in ABC physical entity location storage database 316.

Credit card 318 may symbolize a credit card payment. The beneficiary of the credit card payment may be ABC. The credit card payment may be transmitted to financial institution 320. Financial institution 320 may deposit the funds from the credit card payment into an electronic location designated for ABC within the electronic database of financial institution 320. The credit card payment and any associated information may be transferred from financial institution 320 to credit card payment storage database 322.

Financial institution 320 may perform the transfer of information over an intranet, Internet or other suitable form of communication. An employee of ABC may perform the transfer of information by reviewing a financial institution statement and entering the information into credit card payment storage database 322. The transfer of information may also occur in any other suitable form of information transfer.

The beneficiary of EFT 324 may be ABC. EFT 324 may be transmitted from a party to an electronic location designated for ABC within the electronic database of financial institution 326. EFT 324 and any associated information may be transferred from financial institution 326 to electronic funds transfer storage database 328.

Financial institution 326 may perform the transfer of information over an intranet, Internet or any other suitable form of communication. An employee of ABC may perform the transfer of information by reviewing a financial institution statement and entering the information into electronic funds transfer storage database 328. The transfer of information may also occur in any other suitable form of information transfer.

Figure 4:
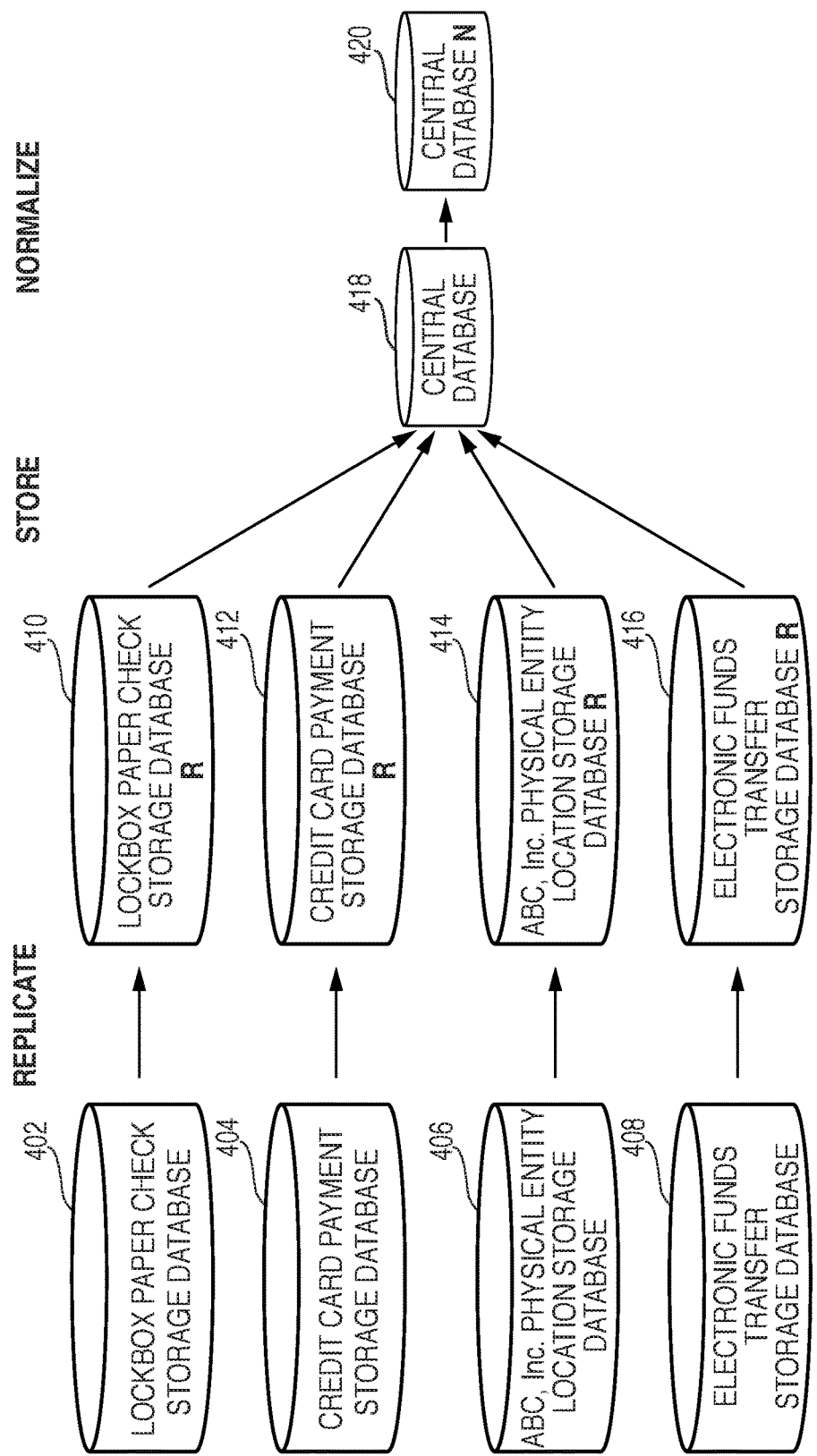
FIG. 4 shows an illustrative diagram according to certain embodiments.

FIG. 4 shows a diagram which illustrates an embodiment of replication, storage and normalization of databases. Lockbox paper check storage database 402 may be replicated to generate lockbox paper check storage database R 410. Lockbox paper check storage database R 410 may be stored in central database 418. Lockbox paper check storage database R 410 may also be stored in an independent storage location.

Credit card payment storage database 404 may be replicated to generate credit card payment storage database R 412. Credit card payment storage database R 412 may be stored in central database 418. Credit card payment storage database R 412 may also be stored in an independent storage location.

ABC physical entity location storage database 406 may be replicated to generate ABC physical entity location storage database R 414. ABC physical entity location storage database R 414 may be stored in central database 418. ABC physical entity location storage database R 414 may also be stored in an independent storage location.

Electronic funds transfer storage database 408 may be replicated to generate electronic funds transfer storage database R 416. Electronic funds transfer storage database R 416 may be stored in central database 418. Electronic funds transfer storage database R 416 may also be stored in an independent storage location.

The data included in central database 418 may undergo a normalization process. The data may be normalized using any suitable normalization process. The normalized data may be included in central database N 420.

Figure 5:
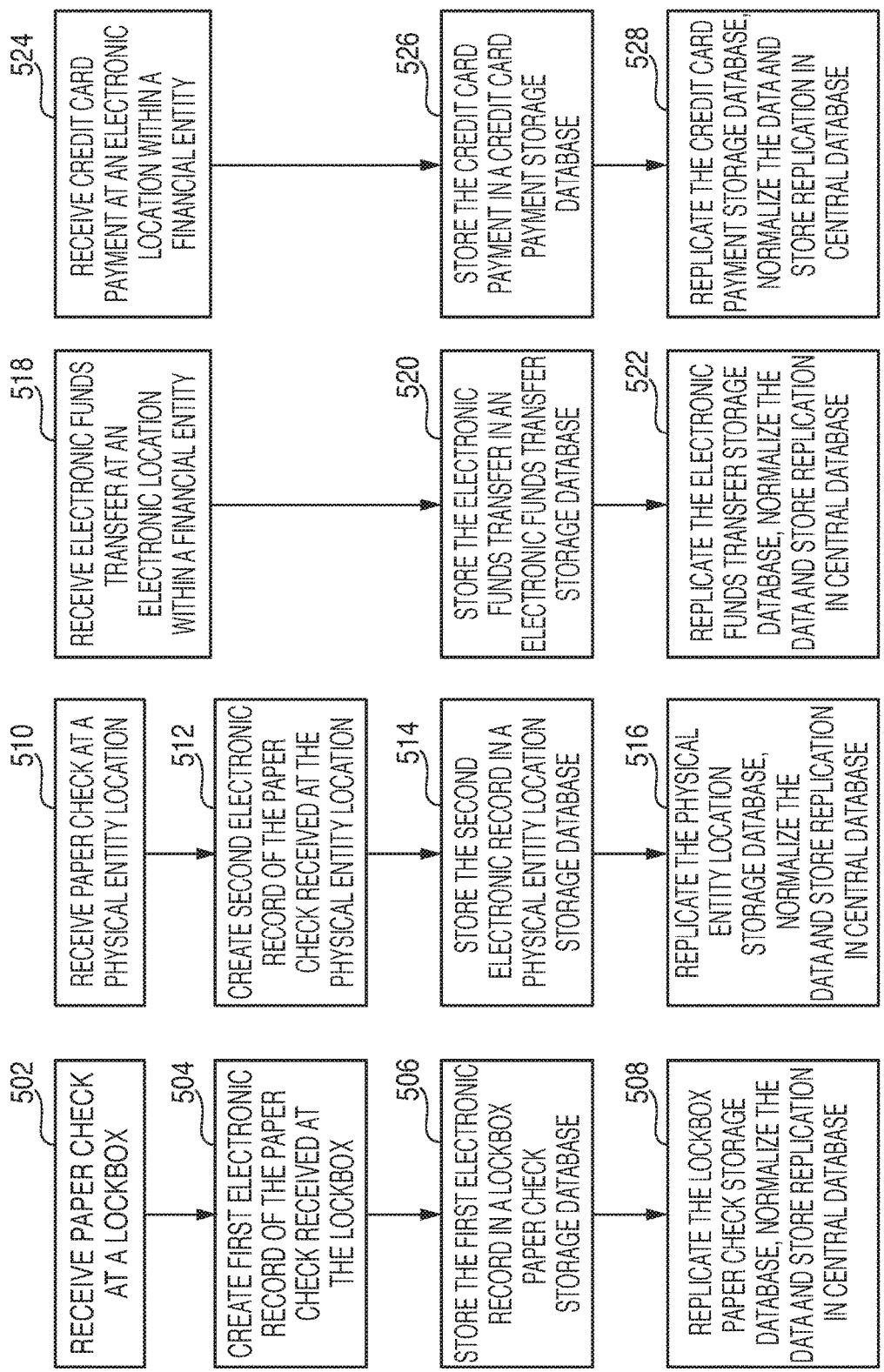
FIG. 5 shows an illustrative diagram according to certain embodiments.

FIG. 5 shows a flow chart which illustrates another embodiment of replication, storing and normalizing of databases. A paper check may be received at a lockbox, as shown at 502. Step 504 shows the creation of a first electronic record of the paper check which may have been received at a lockbox. Step 506 shows the storing of the first electronic record in a lockbox paper check storage database. The lockbox paper check storage database may be replicated, as shown in step 508. The data in the lockbox paper check storage database may be normalized, as shown in step 508. The replicated lockbox paper check storage database may be stored in the central database, as shown in step 508.

Step 510 shows the receipt of a paper check at a physical entity location. Step 512 shows the creation of a second electronic record of the paper check received at the physical entity location. The second electronic record may be stored in a physical entity location storage database, as shown at step 514. Step 516 shows the replication of the physical entity location storage database. The data included in the physical entity location storage database may be normalized, as shown in step 516. The replication may be stored in the central database, as shown in step 516.

Step 518 shows the receipt of an electronic funds transfer at an electronic location within a financial entity. The electronic location may be designated for the beneficiary of the electronic funds transfer. Step 520 shows storing the electronic funds transfer in an electronic funds transfer storage database. The electronic funds transfer storage database may be replicated, as shown in step 522. The data in the electronic funds transfer storage database may be normalized, as shown in step 522. Step 522 also shows storing the replication of the electronic funds transfer storage database in the central database.

Step 524 shows receiving a credit card payment at an electronic location within a financial entity. Step 526 shows storing the credit card payment in a credit card payment storage database. Step 528 shows replicating the credit card payment storage database. The data within the credit card payment storage database may also be normalized, as shown in step 528. Step 528 also shows storing the replication of the credit card payment storage database in the central database.

Storing the replicated databases in a central database may ensure that the search utility may return results in a relatively short time period. Searching through a collection of information in one database may be relatively less time consuming than searching through several disparate databases.

Figure 6:
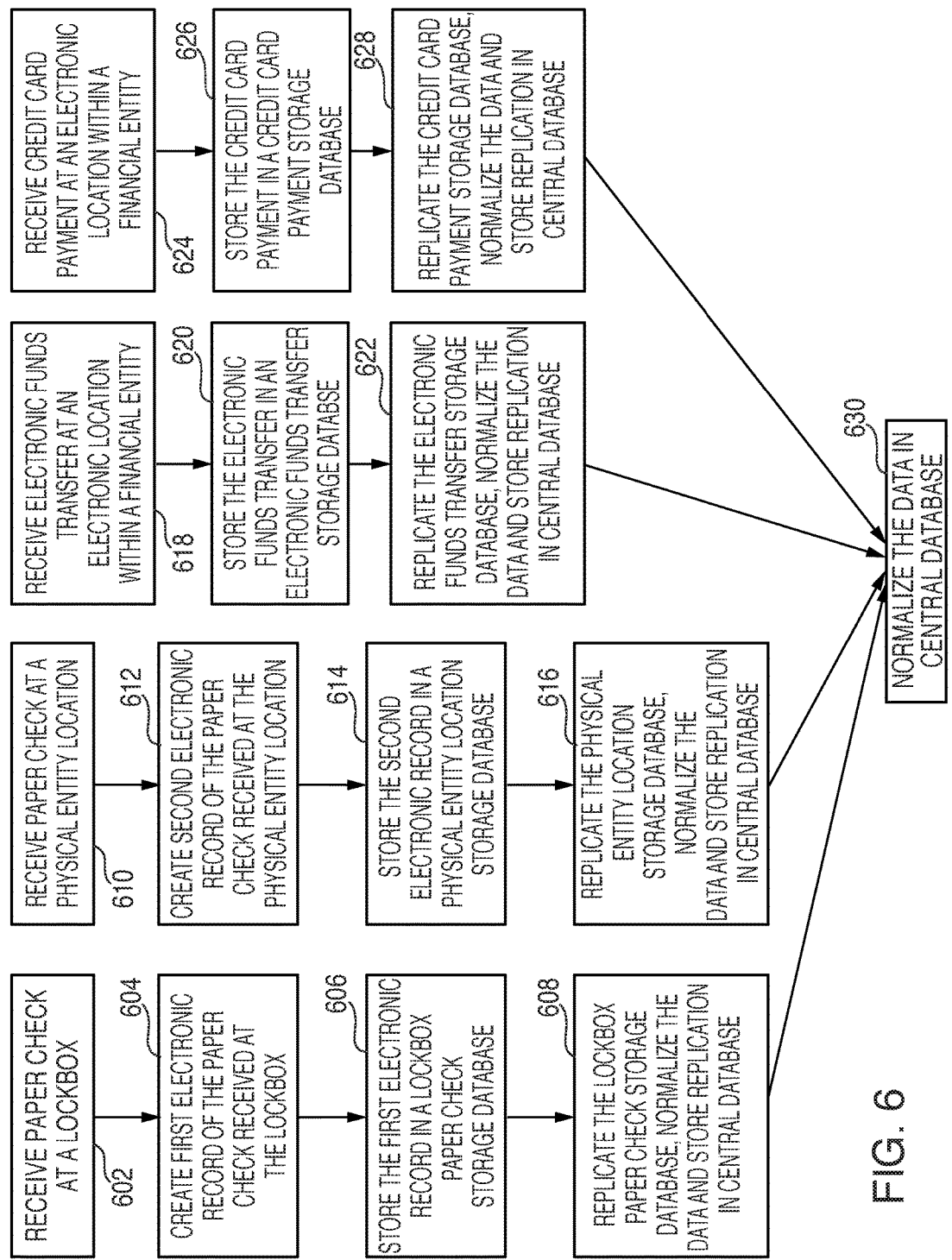
FIG. 6 shows an illustrative diagram according to certain embodiments.

FIG. 6 shows a flow chart which illustrates another embodiment of replication, storing and normalizing of databases. A paper check may be received at a lockbox, as shown at 602. Step 604 shows the creation of a first electronic record of the paper check which may have been received at the lockbox. Step 606 shows the storing of the first electronic record in a lockbox paper check storage database. The lockbox paper check storage database may be replicated, as shown in step 608. The data in the lockbox paper check storage database may be normalized, as shown in step 608. The replicated lockbox paper check storage database may be stored in the central database, as shown in step 608.

Step 610 shows the receipt of a paper check at a physical entity location. Step 612 shows the creation of a second electronic record of the paper check received at the physical entity location. The second electronic record may be stored in a physical entity location storage database, as shown at step 614. Step 616 shows the replication of the physical entity location storage database. The data included in the physical entity location storage database may be normalized, as shown in step 616. The replication may be stored in the central database, as shown in step 616.

Step 618 shows the receipt of an electronic funds transfer at an electronic location within a financial entity. The electronic location may be designated for the beneficiary of the electronic funds transfer. Step 620 shows storing the electronic funds transfer in an electronic funds transfer storage database. The electronic funds transfer storage database may be replicated, as shown in step 622. The data in the electronic funds transfer storage database may be normalized, as shown in step 622. Step 622 also shows storing the replication of the electronic funds transfer storage database in the central database.

Step 624 shows receiving a credit card payment at an electronic location within a financial entity. Step 626 shows storing the credit card payment in a credit card payment storage database. Step 628 shows replicating the credit card payment storage database. The data within the credit card payment storage database may also be normalized, as shown in step 628. Step 628 also shows storing the replication of the credit card payment storage database in the central database.

Step 630 shows the normalization of the data in the central database. The data in the central database may be normalized using a higher forms of normalization.

Normalization of the data using higher forms of normalization may optimize performance of the central database. In some embodiments the data in the central database may be denormalized. Denormalization of the central database may optimize performance of the central database.

Figure 7:
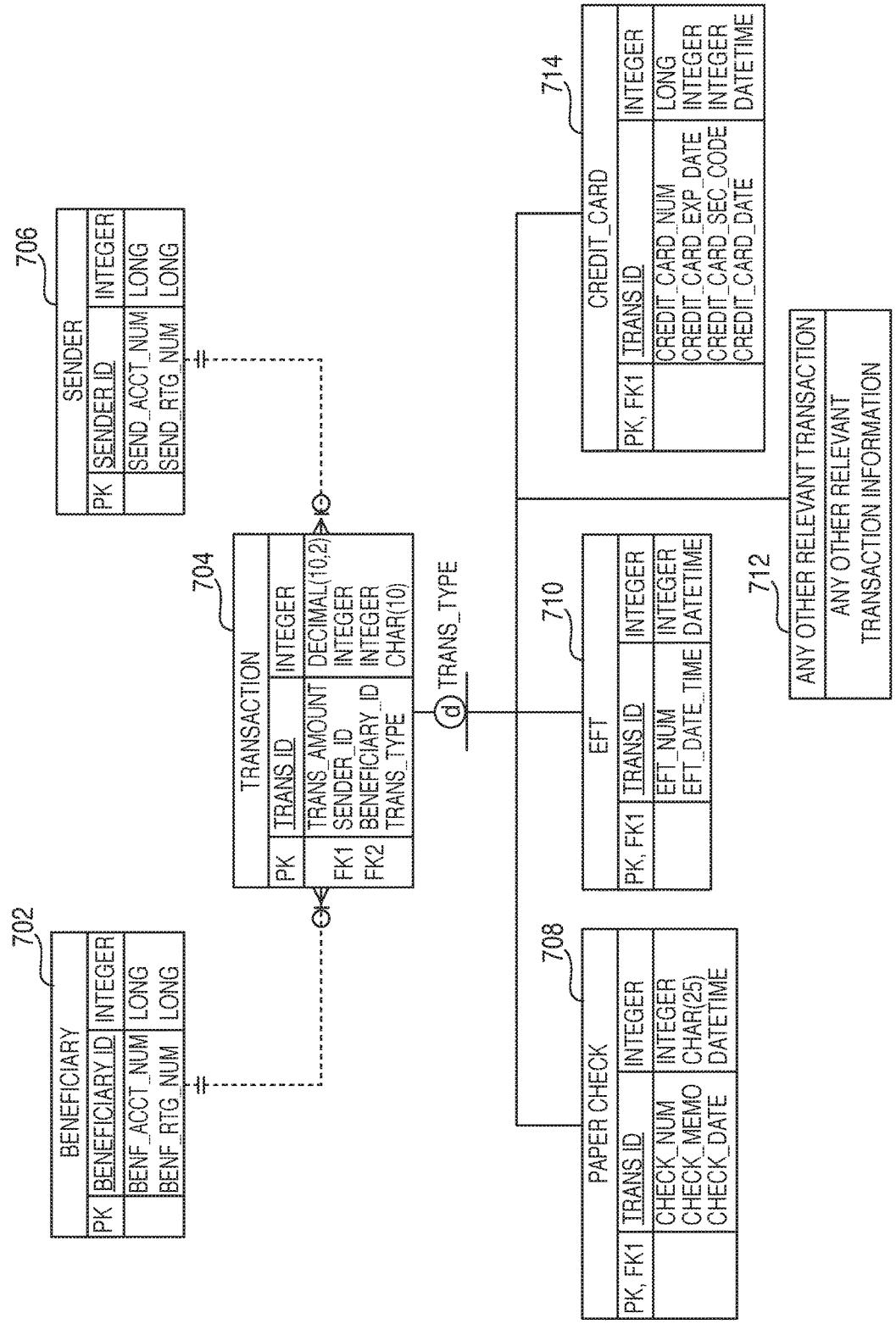
FIG. 7 shows an illustrative diagram according to certain embodiments.

FIG. 7 shows an illustrative entity relationship diagram ("ERD"). The ERD may represent a database. The database may relate to transactions. The ERD may include transaction table 704. Transaction table 704 may include primary key attribute transaction ID. A transaction ID may be an integer type variable. All of the attributes in the transaction table may depend on primary key attribute transaction ID. Transaction table 704 may include a transaction amount attribute. The transaction amount attribute may be a decimal type variable. Transaction table 704 may also include a sender ID. The sender ID may be an integer type variable. The sender ID may be a foreign key. The sender ID may relate to another table on the ERD. Transaction table 704 may also include a beneficiary ID. The beneficiary ID may be an integer type variable. The beneficiary ID may be a foreign key. The beneficiary ID may relate to another table on the ERD. Transaction table 704 may include a transaction type attribute. The transaction type may be a character type variable.

The transaction-type attribute may be a parent to other tables. The children of transaction type may include paper check table 708, EFT table 710, credit card table 714 and any other relevant transaction table 712.

Paper check table 708 may include a transaction ID attribute as the primary key attribute and as a foreign key. Transaction ID attribute may relate to the transaction ID attribute of the transaction table. Paper check table 708 may include a check_num attribute. The check_num attribute may be an integer type variable. The check_num attribute may include the check number of the paper check. Paper check table 708 may also include a check_memo attribute. The check_memo attribute may be a character type variable. The check_memo attribute may include a memo which was written on the check. Paper check table 708 may also include a check_date attribute. The check_date attribute may be a date or time attribute. The check_date attribute may include the date of the check. The check_date attribute may also include the date and time the check was deposited.

EFT table 710 may include transaction ID as the primary key attribute and as a foreign key. The transaction ID attribute may relate to the transaction ID attribute of the transaction table. EFT table 710 may include an EFT_NUM attribute. The EFT_NUM attribute may be an integer type variable. The EFT_NUM attribute may include the number of the EFT. The EFT_NUM may also include the confirmation number of the EFT. The confirmation number may be received from CHIPS, Fedwire, SWIFT or any other suitable clearing house. EFT table 710 may also include an EFT_DATE_TIME attribute. The EFT_DATE_TIME attribute may be a date or time variable. The EFT_DATE_TIME attribute may be the date and time that the EFT was transmitted.

Credit card table 714 may include the transaction ID as the primary key attribute and as a foreign key. The transaction ID attribute may relate to the transaction ID attribute of the transaction table. Credit card table 714 may include a CREDIT_CARD_NUM attribute. The CREDIT_CARD_NUM attribute may be a long type variable. The CREDIT_CARD_NUM attribute may include the credit card number. Credit card table 714 may also include a CREDIT_CARD_EXP_DATE attribute. The CREDIT_CARD_EXP_DATE attribute may be an integer type variable. The CREDIT_CARD_EXP_DATE attribute may be a date or time variable. The CREDIT_CARD_EXP_DATE attribute may include the credit card expiration date. Credit card table 714 may also include a CREDIT_CARD_SEC_CODE attribute. The CREDIT_CARD_SEC_CODE attribute may be an integer type variable. The CREDIT_CARD_SEC_CODE attribute may be an integer type variable. Credit card table 714 may also include a CREDIT_CARD_DATE attribute. The CREDIT_CARD_DATE attribute may be a date or time variable. The CREDIT_CARD_DATE attribute may be the date or time of the point of sale where the credit card was utilized.

Any other relevant transaction table 712 may have child-type dependency to transaction table 704. Any other relevant transaction table 712 may include any other relevant transaction information.

Beneficiary table 702 may include a beneficiary ID attribute as the primary key attribute. The beneficiary ID attribute may be an integer type variable. Beneficiary table 702 may include a BENF_ACCT_NUM attribute. The BENF_ACCT_NUM attribute may be an account number of the beneficiary. The BENF_ACCT_NUM attribute may be a long type variable. Beneficiary table 702 may also include a BENF_RTG_NUM attribute. The BENF_RTG_NUM attribute may be a routing number of the beneficiary. Beneficiary table 702 may have a one to many relationship with the transaction table 704. One entity may be the beneficiary of many transactions.

Sender table 706 may include a sender ID attribute as the primary key attribute. The sender ID may be an integer type variable. Sender table 706 may include a SEND_ACCT_NUM attribute. The SEND_ACCT_NUM attribute may be an account number of the sender. The SEND_ACCT_NUM attribute may be a long type variable. Sender table 706 may also include a SEND_RTG_NUM attribute. The SEND_RTG_NUM attribute may be a routing number of the sender. Sender table 706 may have a one to many relationship with the transaction table 704. One entity may be the sender in more than one transaction.

Figure 8:
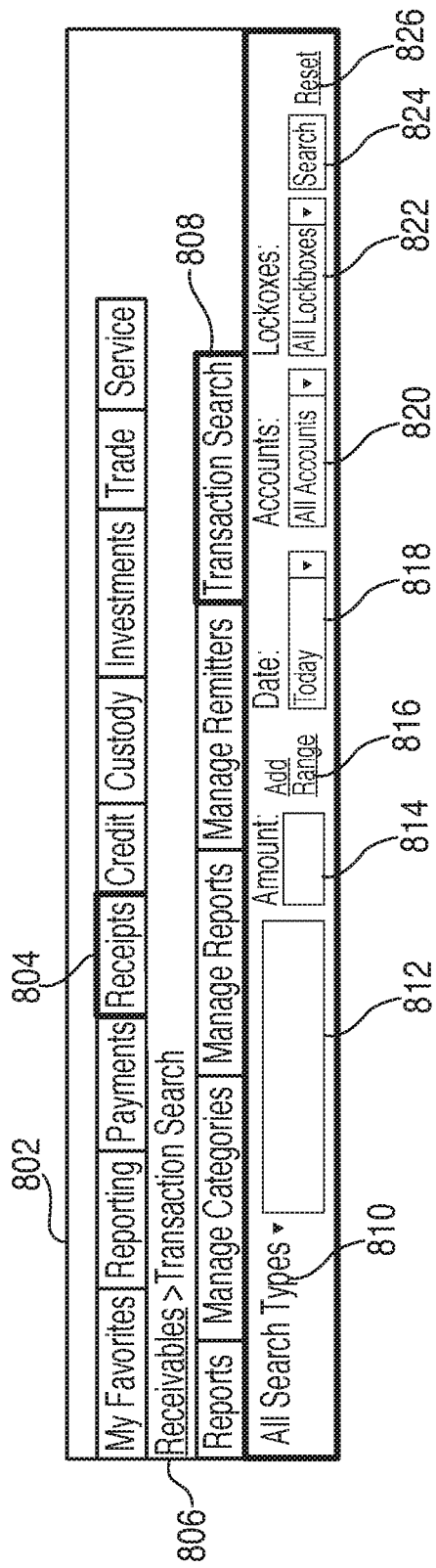
FIG. 8 shows an illustrative diagram according to certain embodiments.

FIG. 8 shows an illustrative diagram of a search utility. Search utility 802 may be viewable on receipts tab 804. Text line 806 shows that the transactions search relates to receivables. Transaction search tab 808 shows that the utility may be currently directed to a transaction search. Text 810, which shows all search types, may demonstrate that the search utility is currently configured to search in all search types.

The search may be an accounts receivable information query. The accounts receivable information query may be inputted by a system user into search entry field 812. Amount entry field 814 may accept system user input relating to amount information. The amount information may limit the scope of the accounts receivable query to data objects which relate to the entered amount. Add range link 816 may enable a system user to change the amount entry field to an amount range entry field. An amount range entry field may allow a system user to enter a range of amounts in order to broaden the search criterion.

Date entry field 818 may accept system user input relating to date information. The date information may limit the scope of the accounts receivable information query to data objects which include the date information. The date information may include a specific date. The date information may also include a range of dates.

Account entry field 820 may accept system user input relating to which account, or to which grouping of accounts, the accounts receivable information query relates. The system user entered account information may limit the scope of the accounts receivable query to data objects which include, or relate to, the system user-entered account or group of accounts.

Lockbox entry field may accept system user input relating to which lockbox, or to which grouping of lockboxes the accounts receivable information query relates. The lockbox information may limit the scope of the accounts receivable information query to data objects which include, or relate to, the system user-entered lockbox.

The search utility may also include search button 824. Search button 824 may be configured to begin searching the central database when clicked.

The search utility may also include reset button 826. Reset button 826 may be configured to reset all of the fields in the search utility to the default fields.

Figure 9:
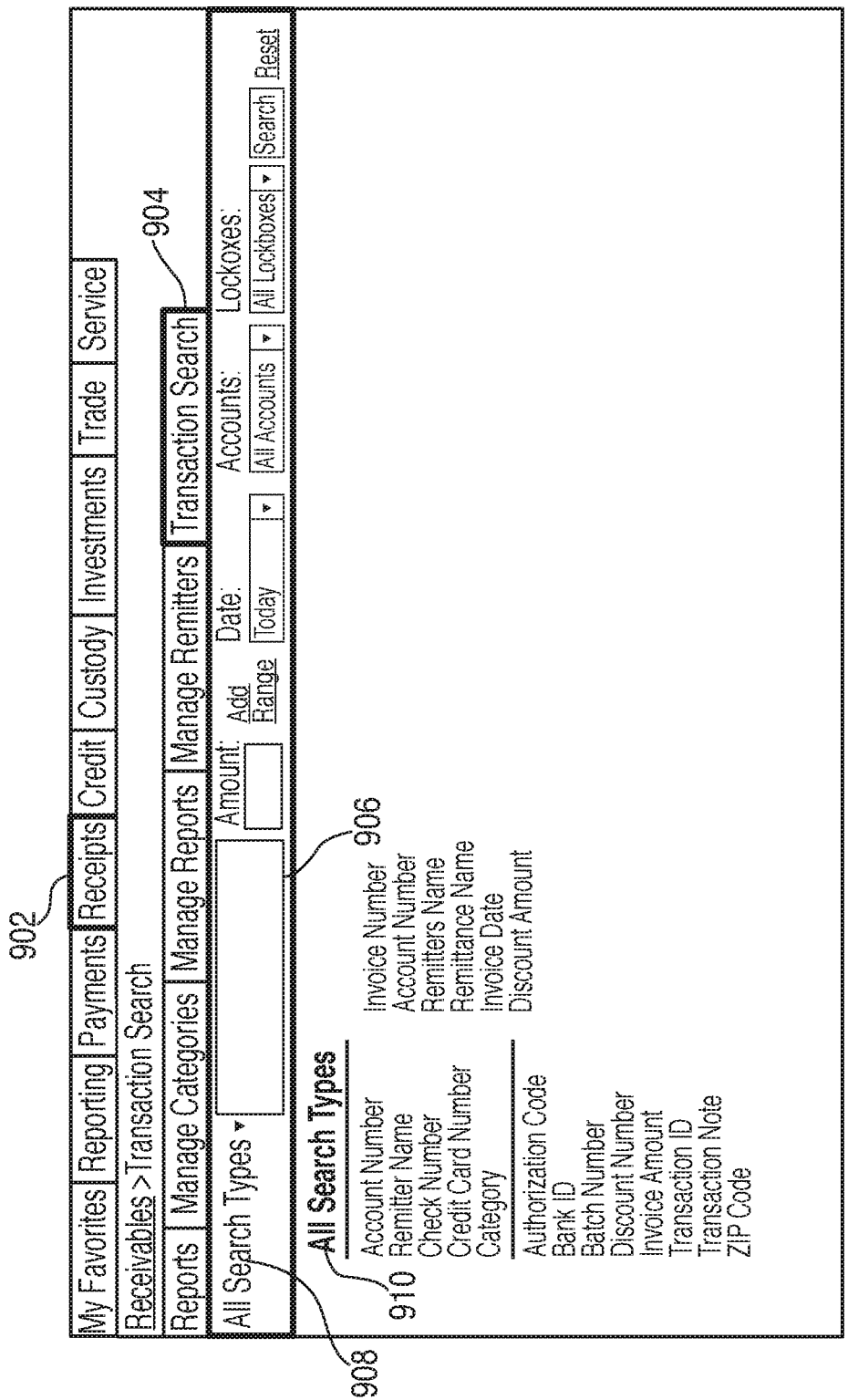
FIG. 9 shows an illustrative diagram according to certain embodiments.

FIG. 9 shows an illustrative diagram of a search utility. In this embodiment, the search utility may be viewed on receipts tab 902 and transaction search tab 904. In this embodiment, there may be a drop down from all search types field 908. All search types drop down selector 910 may include different search types from which a system user may choose. A system user may choose from account number, remitter name, check number, credit card number, category and many other suitable search types. The system user-selected search type may limit the scope of the accounts receivable information query. The accounts receivable information query may be entered into search field 906.

Figure 10:
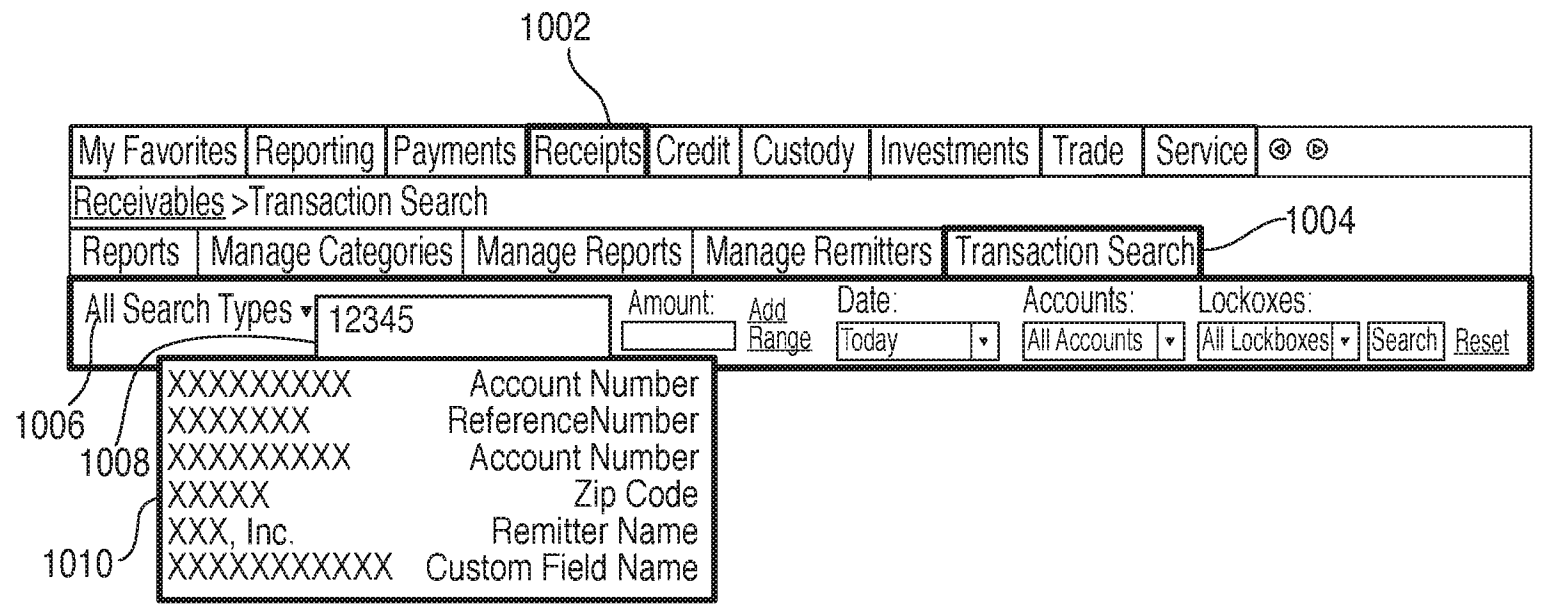

FIG. 10 shows an illustrative diagram of a search utility. In this embodiment, the search utility is being viewed on receipts tab 1002 and transaction search tab 1004. A system user may have chosen to search in all of the search types, as shown at 1006. A system user may have entered the number sequence "12345" into search type entry field 1008.

The search utility may display to the system user a probable listing result set 1010. Probable listing result set 1010 may include a listing of possible results to the accounts receivable information query. The listing may also display, to the system user, number sequences which correspond to the system user-entered number sequence. The presented number sequences may correspond to the system user-entered number sequence at a level of correlation that exceeds a threshold level of correlation. This may allow a system user to reconcile invoices, even if the invoices do not match the payment exactly. The listing also may also display to the system user to what the number sequence correspond—e.g. a system user may have entered "12345", the search utility may display an account number which includes the number sequence "123" because it corresponds to the system user's query above a threshold level of correlation.

Figure 11:
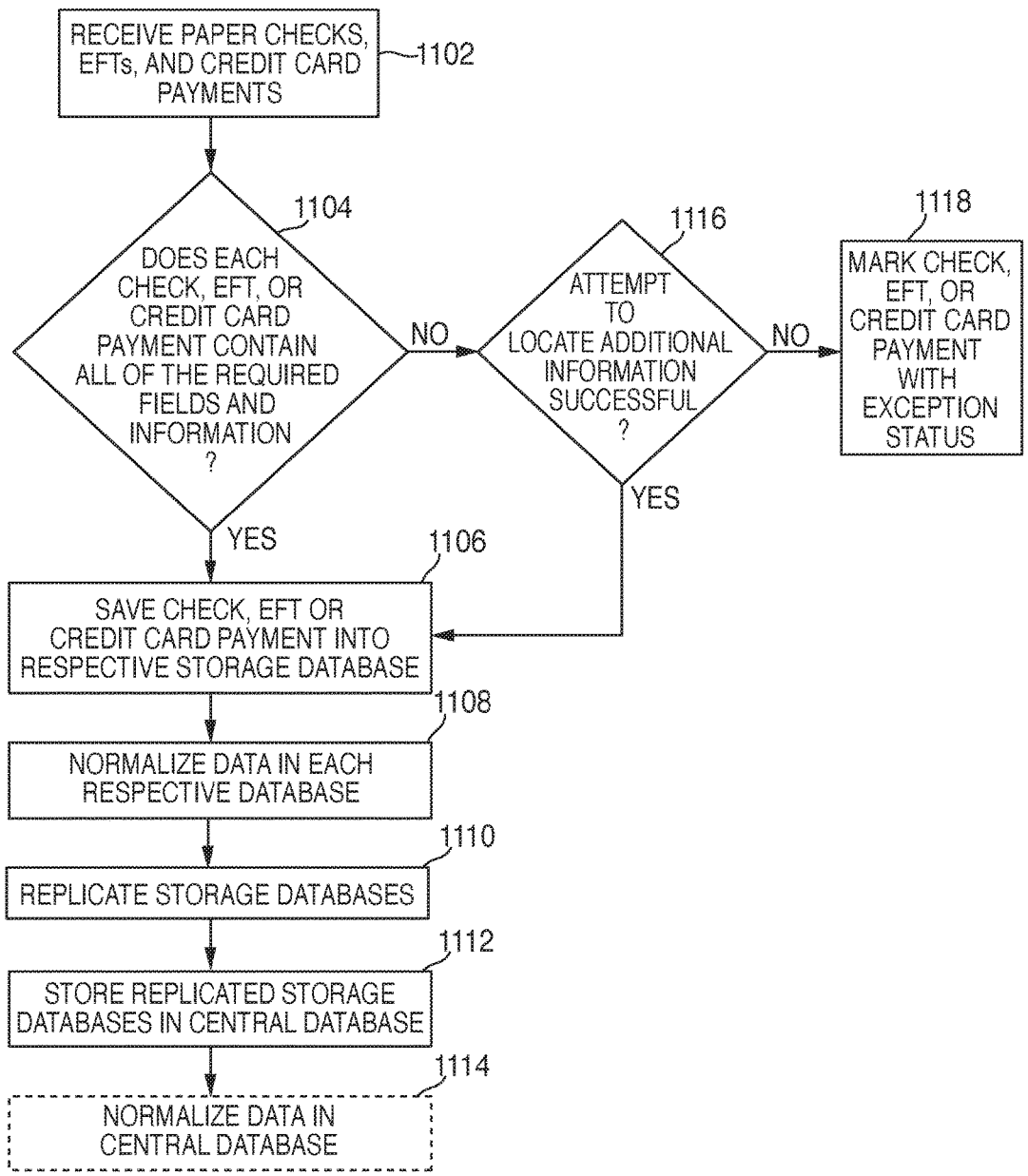
FIG. 11 shows an illustrative flow chart according to certain embodiments.

FIG. 11 shows a flow chart depicting an embodiment of analyzing, replicating, storing and normalizing databases. Step 1102 shows receipt of paper checks, EFTs and credit card payments. Decision step 1104 analyzes if each check, EFT or credit card payment contain all of the required fields. If the checks, EFTs and credit card payments do not contain all of the required fields the process may proceed to step 1116. Decision step 1116 may attempt to locate additional information to complete the required fields. If the attempt to locate the additional information was unsuccessful, the process may proceed to step 1118. Step 1118 shows marking the check, EFT or credit card payment with an exception status. Payments with an exception status may require additional review.

If each check, EFT or credit card payment does contain the required information, the process may proceed to step 1106. If the attempt to locate the additional information was successful, the process may also proceed to step 1106. Step 1106 shows saving the check, EFT or credit card payment into each payment type's respective database. Step 1108 shows normalizing the data within each respective database.

Step 1110 shows replicating the storage databases. Step 1112 shows storing the replicated storage databases in the central database. Step 1114 shows normalizing the data in the central database.

Thus, methods and apparatus for replicating and analyzing databases are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for replicating and analyzing multiple databases, the method comprising:
receiving a paper check at a system user's lockbox;
receiving a paper check at a physical entity location of the system user;
receiving an electronic funds transfer at an electronic location designated for the system user within a financial entity's electronic database;
receiving a credit card payment at the electronic location designated for the system user within the financial entity's electronic database;
creating a first electronic record of the paper check received at the system user's lockbox;
storing the first electronic record in a lockbox paper check storage database;
creating a second electronic record of the paper check received at the physical entity location of the system user;
storing the second electronic record in a physical entity location storage database;
storing the electronic funds transfer in an electronic funds transfer storage database;
storing the credit card payment in a credit card payment storage database;
replicating the lockbox paper check storage database and storing the replicated lockbox paper check storage database in a central database;
replicating the physical entity location storage database and storing the replicated physical entity location storage database in the central database;
replicating the electronic funds transfer storage database and storing the replicated electronic funds transfer storage database in the central database;
replicating the credit card payment storage database and storing the replicated credit card payment storage database in the central database;
normalizing the data in the central database;
searching, utilizing a search utility, for data in the central database, said search utility comprising a search box.

2. The method of claim 1, wherein the search utility further comprises a probable listing result set when a system user enters a first portion of information into the search box.

3. The method of claim 2, wherein the probable listing result set is dynamically generated based at least in part on information associated with an electronic lockbox system of the system user.

4. The method of claim 2, wherein the probable listing result set is dynamically generated based at least in part on information associated with an enterprise resource planning system of the system user.

5. The method of claim 2 wherein the probable listing result set is dynamically generated based at least in part on information associated with an authenticated space corresponding to the system user.

6. The method of claim 1, wherein the search utility comprises a search type entry field, an amount entry field, a date entry field, an account entry field, a lockbox entry field and a search button.

7. The method of claim 6, wherein when the system user enters information only into the search box, the search utility is configured to search in all search type categories.

8. An apparatus for replicating and analyzing multiple databases, the apparatus comprising:
at least one receiver configured to receive a paper check and convert said paper check into an electronic record using a conversion processor, wherein said paper check was delivered to a system user either at a lockbox associated with the system user or at the physical entity location associated with the system user;
the at least one receiver configured to receive an electronic funds transfer, wherein said electronic funds transfer was delivered to an electronic location designated for the system user within a financial entity's electronic database;
the at least one receiver further configured to receive a credit card payment, wherein said credit card payment was delivered to the electronic location designated for the system user within the financial entity's electronic database;
a storage processor further configured store the electronic record in a paper check storage database;
the storage processor configured to store the electronic funds transfer in an electronic funds transfer storage database;
the storage processor configured to store the credit card payment in a credit card payment storage database;
the storage processor configured to replicate the paper check storage database, the electronic funds transfer storage database and the credit card payment storage database;
the storage processor configured to store the replicated paper check storage database, the replicated electronic funds transfer storage database and the replicated credit card payment storage database in a central database;
the storage processor further configured to normalize the data in the central database;

a search utility comprising a search box, said search utility configured to enable a the system user to search for data included in the central database.

9. The apparatus of claim 8, wherein the search utility further comprises a probable listing result set when a system user enters a first portion of information into the search box.

10. The apparatus of claim 9, wherein the probable listing result set is dynamically generated based at least in part on information associated with an electronic lockbox system of the system user.

11. The apparatus of claim 9, wherein the probable listing result set is dynamically generated based at least in part on information associated with an enterprise resource planning system of the system user.

12. The apparatus of claim 9, wherein the probable listing result set is dynamically generated based at least in part on information associated with an authenticated space corresponding to the system user.

13. The apparatus of claim 8, wherein the search utility comprises a search type entry field, an amount entry field, a date entry field, an account entry field, a lockbox entry field and a search button.

14. The apparatus of claim 13, where when the system user enters information only in the search box, the search utility is configured to search in all search type categories.

* * * * *